(12) United States Patent
Furushima et al.

(10) Patent No.: US 7,757,025 B2
(45) Date of Patent: Jul. 13, 2010

(54) PROGRAMMABLE LOGIC CONTROLLER PERIPHERAL DEVICE AND PROGRAM CREATION METHOD THEREOF

(75) Inventors: Hiroyuki Furushima, Tokyo (JP); Makoto Nonomura, Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 455 days.

(21) Appl. No.: 10/562,012

(22) PCT Filed: Apr. 15, 2004

(86) PCT No.: PCT/JP2004/005358

§ 371 (c)(1), (2), (4) Date: Dec. 23, 2005

(87) PCT Pub. No.: WO2005/101147

PCT Pub. Date: Oct. 27, 2005

(65) Prior Publication Data

US 2006/0155889 A1 Jul. 13, 2006

(51) Int. Cl.
G05B 11/01 (2006.01)
(52) U.S. Cl. .................. 710/104; 710/1; 700/18
(58) Field of Classification Search ........... 710/8, 710/22; 708/130; 700/18, 86; 714/718; 717/104, 135
See application file for complete search history.

(56) References Cited

U.S. PATENT DOCUMENTS

| 4,200,915 | A | * | 4/1980 | Struger et al. ............ 700/87 |
| 4,455,619 | A | * | 6/1984 | Masui et al. ............. 345/530 |
| 4,908,746 | A | * | 3/1990 | Vaughn ................... 700/18 |
| 5,243,511 | A | * | 9/1993 | Zifferer et al. ............ 700/18 |
| 5,349,518 | A | * | 9/1994 | Zifferer et al. ............ 700/87 |
| 5,717,588 | A | * | 2/1998 | Yamane et al. ........... 700/86 |
| 5,812,394 | A | * | 9/1998 | Lewis et al. ............. 700/17 |
| 5,886,274 | A | * | 3/1999 | Jungleib ................ 84/601 |
| 5,920,717 | A | * | 7/1999 | Noda ................... 717/104 |
| 6,161,051 | A | * | 12/2000 | Hafemann et al. ........ 700/86 |
| 6,173,208 | B1 | * | 1/2001 | Park et al. .............. 700/83 |

(Continued)

FOREIGN PATENT DOCUMENTS

EP 1 213 633 A 6/2002

(Continued)

Primary Examiner—Henry W. H. Tsai
Assistant Examiner—Cheng-Yuan Tseng
(74) Attorney, Agent, or Firm—Sughrue Mion, PLLC

(57) ABSTRACT

A peripheral device for a programmable logic controller according to the invention includes: an instruction table for correlatively storing instructions and the input/output types of parameters for the instructions; a search/discrimination means for searching the instruction table for an instruction in a code in a portion of a sequence program selected as diversion data from an existing diversion-source sequence program, to discriminate the input/output type of a parameter for the instruction; a search result creating/storing means for creating and storing a search result table by combining an address in the code in the selected portion of the sequence program, with the input/output type; a component data creating means for creating a variable data table by replacing the input/output types stored in the search result table with variable names, and for creating component data by adding the corresponding variable names to variables and to circuit information; and a component data diversion means for diverting the component data into an arbitrary position in a designated sequence program.

5 Claims, 10 Drawing Sheets

U.S. PATENT DOCUMENTS

| | | | | |
|---|---|---|---|---|
| 6,226,555 B1 * | 5/2001 | Kallal et al. | ................... | 700/21 |
| 6,477,435 B1 | 11/2002 | Ryan et al. | | |
| 6,618,856 B2 * | 9/2003 | Coburn et al. | ................ | 717/135 |
| 6,651,110 B1 * | 11/2003 | Caspers et al. | ................. | 710/13 |
| 6,826,432 B2 * | 11/2004 | Beck et al. | ..................... | 700/18 |
| 6,832,118 B1 * | 12/2004 | Heberlein et al. | ............. | 700/18 |
| 6,850,808 B2 * | 2/2005 | Yuen et al. | .................... | 700/86 |
| 6,901,316 B1 * | 5/2005 | Jensen et al. | ................ | 700/286 |
| 6,983,227 B1 * | 1/2006 | Thalhammer-Reyero | ....... | 703/2 |
| 7,203,931 B2 * | 4/2007 | Minamide et al. | ........... | 717/136 |
| 7,266,476 B2 * | 9/2007 | Coburn et al. | ................ | 702/183 |
| 7,266,767 B2 * | 9/2007 | Parker | ........................ | 715/255 |
| 7,484,200 B2 * | 1/2009 | Joffrain et al. | ............... | 717/100 |
| 7,505,817 B2 * | 3/2009 | McDaniel et al. | ............. | 700/18 |
| 2002/0147505 A1 * | 10/2002 | Beck et al. | ..................... | 700/18 |
| 2003/0033037 A1 | 2/2003 | Yuen et al. | | |
| 2005/0027507 A1 * | 2/2005 | Patrudu | ......................... | 704/1 |
| 2006/0155889 A1 * | 7/2006 | Furushima et al. | ............. | 710/8 |
| 2006/0242491 A1 * | 10/2006 | Axnix et al. | ................. | 714/718 |

FOREIGN PATENT DOCUMENTS

| | | |
|---|---|---|
| JP | 6-95712 A | 4/1994 |
| JP | 11-3105 A | 1/1999 |
| JP | 2003-44108 A | 2/2003 |

* cited by examiner

PROGRAMMABLE LOGIC CONTROLLER PERIPHERAL DEVICE AND PROGRAM CREATION METHOD THEREOF

TECHNICAL FIELD

The present invention relates to peripheral devices for a programmable logic controller for creating and editing sequence programs for a programmable logic controller (hereinafter, accordingly referred to as a PLC), and program creating methods therefor.

BACKGROUND ART

A conventional peripheral device for a PLC will be described below.

Operations in which in a conventional peripheral device for a PLC as disclosed, for example, in Japanese Patent Laid-Open No 44108/2003, a portion of a sequence program, designated by an operator, is diverted from diversion-source sequence program data that was created in the past into diversion-destination sequence program data will be described.

Firstly, in the diversion-source sequence program, an operator selects using an input device a portion of a sequence program to be diverted and performs copying.

Next, a peripheral device for a PLC carries out processing for copying into diversion data the selected portion of the sequence program to be diverted.

Next, the operator pastes the selected portion of the sequence program to be diverted to a portion into which the operator desires to insert in the diversion-destination sequence program.

Next, the peripheral device for a PLC inserts the portion of the sequence program to be diverted, recorded in the diversion data, into the position designated by the operator in the diversion-destination sequence program data.

According to the above-described processing, diversion of the portion of the sequence program to be diverted from the diversion-source sequence program data into the position designated by the operator in the diversion-destination sequence program data has been completed.

However, usually, an operation for replacing addresses used in the diverted portion of the sequence program in accordance with the diversion-destination sequence program must be performed. The replacement operation must be performed by the operator.

In the conventional peripheral device for a PLC, when a sequence program created in the past is reused to create a new sequence program, after a portion of the sequence program created in the past is copied and pasted into the new sequence program, it has been necessary that input/output addresses and internal addresses are manually replaced by the operator one by one. The replacement operation must be performed while considering address duplication and input/output types, so that a problem has been that creating a new sequence program by reusing a sequence program cannot be efficiently performed.

In addition, another problem has been that, when the same portion of a sequence program is diverted into a plurality of points, or diverted into a plurality of new sequence programs, the pasting of the portion of the sequence program and the operation of replacing input/output addresses and internal addresses must be manually repeated by the number of diversion points, which is inefficient.

DISCLOSURE OF THE INVENTION

The present invention is made to resolve such problems described above, and aims to provide a peripheral device for a PLC that can efficiently create a new sequence program by reusing an old sequence program with simple operations, and a program creating method therefor.

A peripheral device for a PLC relevant to the invention includes: an instruction table for correlatively storing instructions and the input/output types of parameters for the instructions; a search/discrimination means for searching the instruction table for an instruction in a code in a portion of a sequence program selected as diversion data from an existing diversion-source sequence program, to discriminate the input/output type of a parameter for the instruction; a search result creating/storing means for creating and storing search result table by combining the discriminated input/output type, with an address in the code in the selected portion of the sequence program; a component data creating means for creating a variable data table by replacing the input/output types stored in the search result table with variable names, and for creating component data by adding the corresponding variable names to variables and to circuit information; and a component data diversion means for diverting the component data into an arbitrary position in a new sequence program as a diversion destination.

Accordingly, when an operation is performed in which a portion of an existing sequence program created in the past is copied and pasted into a new sequence program, input/output addresses and internal addresses that require replacement are automatically replaced; whereby the operator does not have to manually replace the input/output addresses and the internal addresses, so that the existing sequence program can be diverted and reused to efficiently create a new sequence program.

In addition, the peripheral device for a PLC relevant to the invention includes: a sequence-program-component storing means for storing into a component storage the created component data as a sequence program component; a sequence-program-component displaying means for displaying the sequence program components stored in the component storage; a sequence-program-component selecting means for selecting a desired sequence program component from the sequence program components displayed by the sequence-program-component displaying means; and a sequence-program-component diversion means for diverting the selected sequence program component into a new sequence program.

Accordingly, when an operation is performed in which a portion of an existing sequence program created in the past is copied and pasted into a new sequence program, the portion of the sequence program can be stored as a sequence program component, so that the stored sequence program component can be diverted and reused to efficiently create a new sequence program.

Moreover, a program creating method for a peripheral device for a PLC relevant to the invention is a program creating method of copying a portion of an existing sequence program and pasting the portion into a new sequence program, for a peripheral device for a PLC, and includes: a search/discrimination step of, with an instruction table for correlatively storing instructions and the input/output types of parameters for the instructions, searching the instruction table for an instruction in a code in a portion of the sequence program selected as diversion data from an existing diversion-source sequence program, to discriminate the input/output type of a parameter for the instruction; a search result creating/storing step of creating and storing search result table by combining the discriminated input/output type, with an address in the code in the selected portion of the sequence program; a component data creating step of creating a variable data table by replacing the input/output types stored in the search result table with variable names, and for creating component data by adding the corresponding variable names to variables and to circuit information; and a component data diversion step of diverting the component data into an arbitrary position in a new sequence program as a diversion destination.

Accordingly, when an operation is performed in which a portion of an existing sequence program created in the past is copied and pasted into a new sequence program, input/output addresses and internal addresses that require replacement are automatically replaced; whereby the operator does not have to manually replace the input/output addresses and the internal addresses, so that the existing sequence program can be diverted and reused to efficiently create a new sequence program.

In addition, the program creating method for a peripheral device for a PLC relevant to the invention includes: a sequence-program-component storing step of storing into a component storage the created component data as a sequence program component; a sequence-program-component displaying step of displaying the sequence program components stored in the component storage; a sequence-program-component selecting step of selecting a desired sequence program component from the sequence program components displayed in the sequence-program-component displaying step; and a sequence-program-component diversion step of diverting into a new sequence program the desired sequence program component that has been selected.

Accordingly, when an operation is performed in which a portion of an existing sequence program created in the past is copied and pasted into a new sequence program, the portion of the sequence program can be stored as a sequence program component, so that the stored sequence program component can be diverted and reused to efficiently create a new sequence program.

BEST MODE FOR CARRYING OUT THE INVENTION

Embodiment 1

A preferred embodiment of the present invention will be described using drawings.

Figure 1:
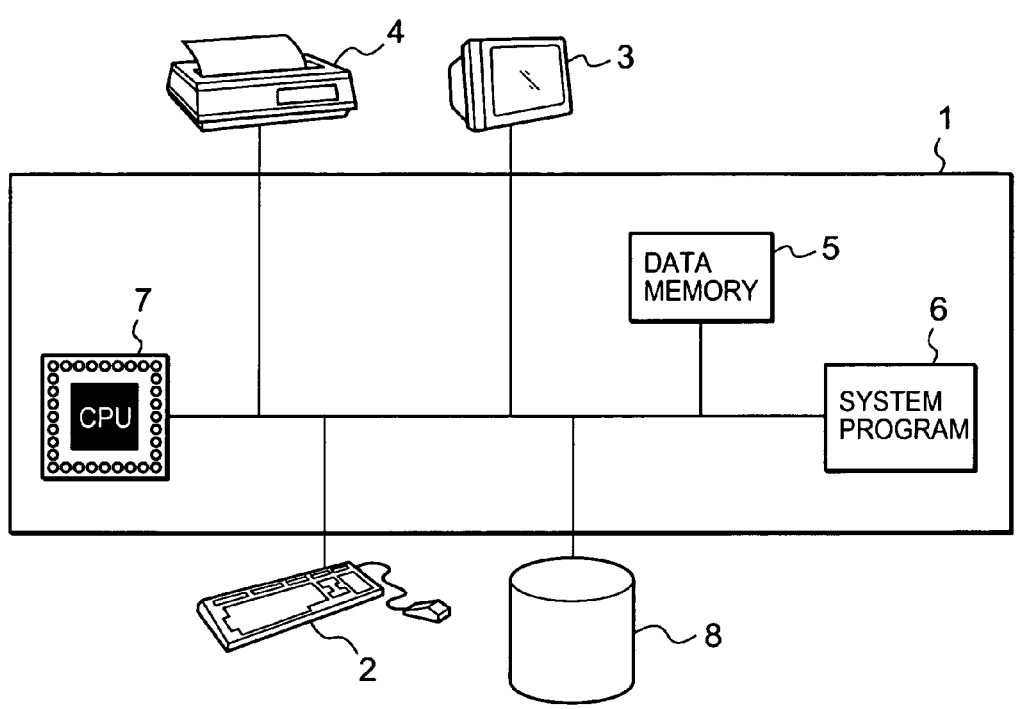
FIG. 1 is a system configuration diagram of a peripheral device for a PLC according to the present invention.

FIG. 1 is a system configuration diagram of a peripheral device for a PLC of the present invention. In the diagram, numeral 1 denotes a main body of the peripheral device for a PLC; numeral 2 denotes an input device such as a keyboard; numeral 3 denotes a display device such as a CRT; numeral 4 denotes a printing device such as a printer; numeral 5 denotes a data memory for storing sequence programs, variable data table, and the like; numeral 6 denotes a system program; numeral 7 denotes a central processing unit for processing the system program; and numeral 8 denotes an external storage device such as a hard disk.

Figure 2:
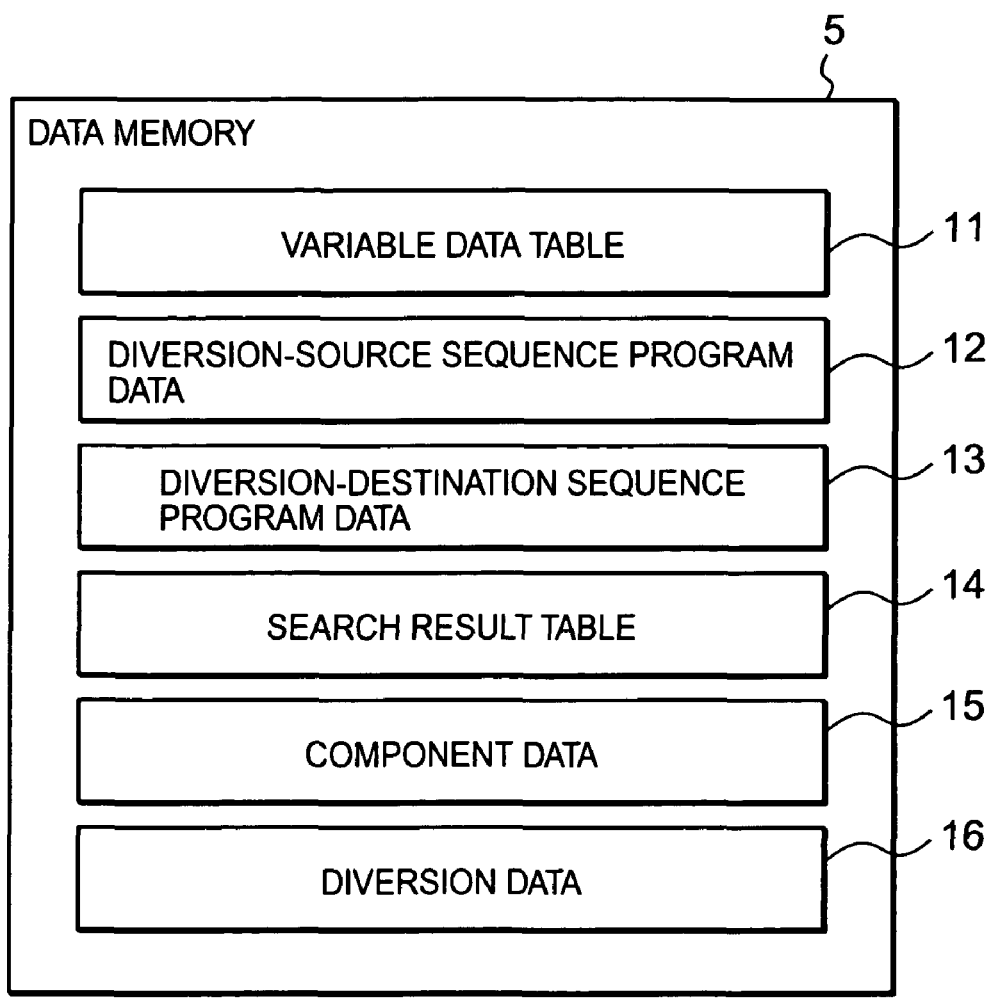
FIG. 2 is a structure diagram of a data memory in the peripheral device for a PLC according to the present invention.

FIG. 2 is a structure diagram of the data memory 5 illustrated in FIG. 1. In FIG. 2, numeral 11 denotes the variable data table including variables—alias names—that are generalized addresses, and addresses assigned to the variables by compiling a program; written by an operator; numeral 12 denotes diversion-source sequence program data created in the past; numeral 13 denotes diversion-destination sequence program data that is being newly created; numeral 14 denotes an address/variable search result table; numeral 15 denotes component data for temporarily storing a portion of the sequence program cut out in the present invention from the sequence program written by the operator; and numeral 16 denotes diversion data for temporarily storing a portion of the sequence program to be diverted.

Figure 3:
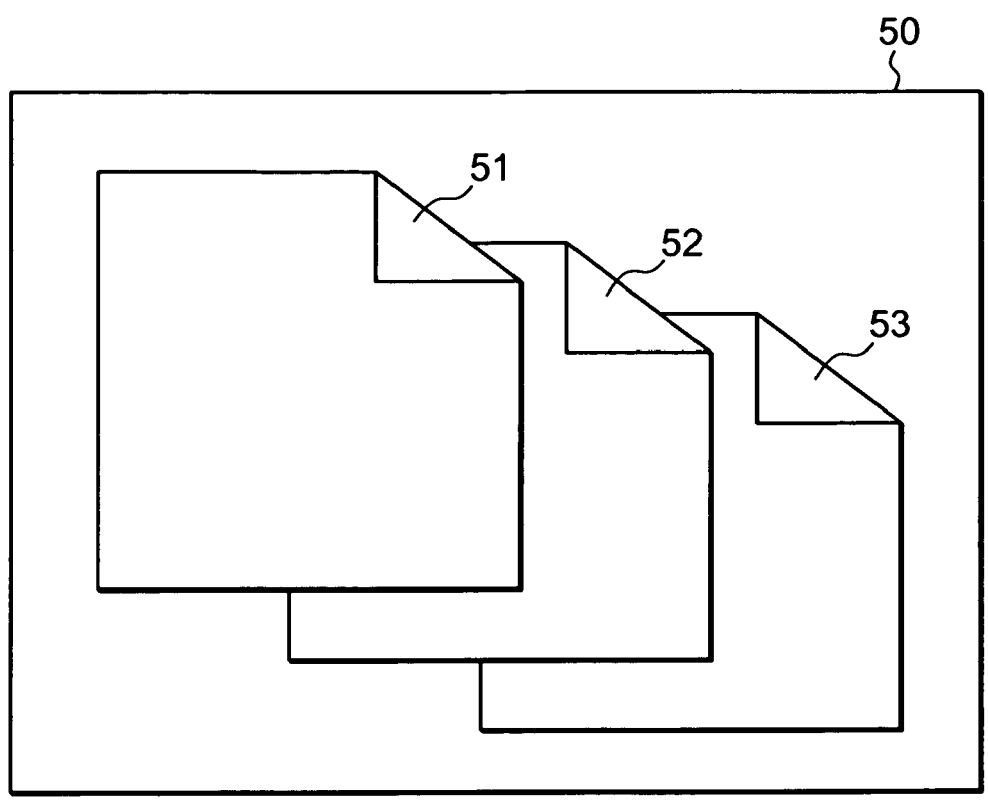
FIG. 3 is a structure diagram of a component storage provided in an external storage in the peripheral device for a PLC according to the present invention.

FIG. 3 is a structure diagram of a component storage 50 created in the external storage device 8 illustrated in FIG. 1. Numerals 51, 52, and 53 denote sequence program components that have been componentized and stored in the component storage 50.

Figure 4:
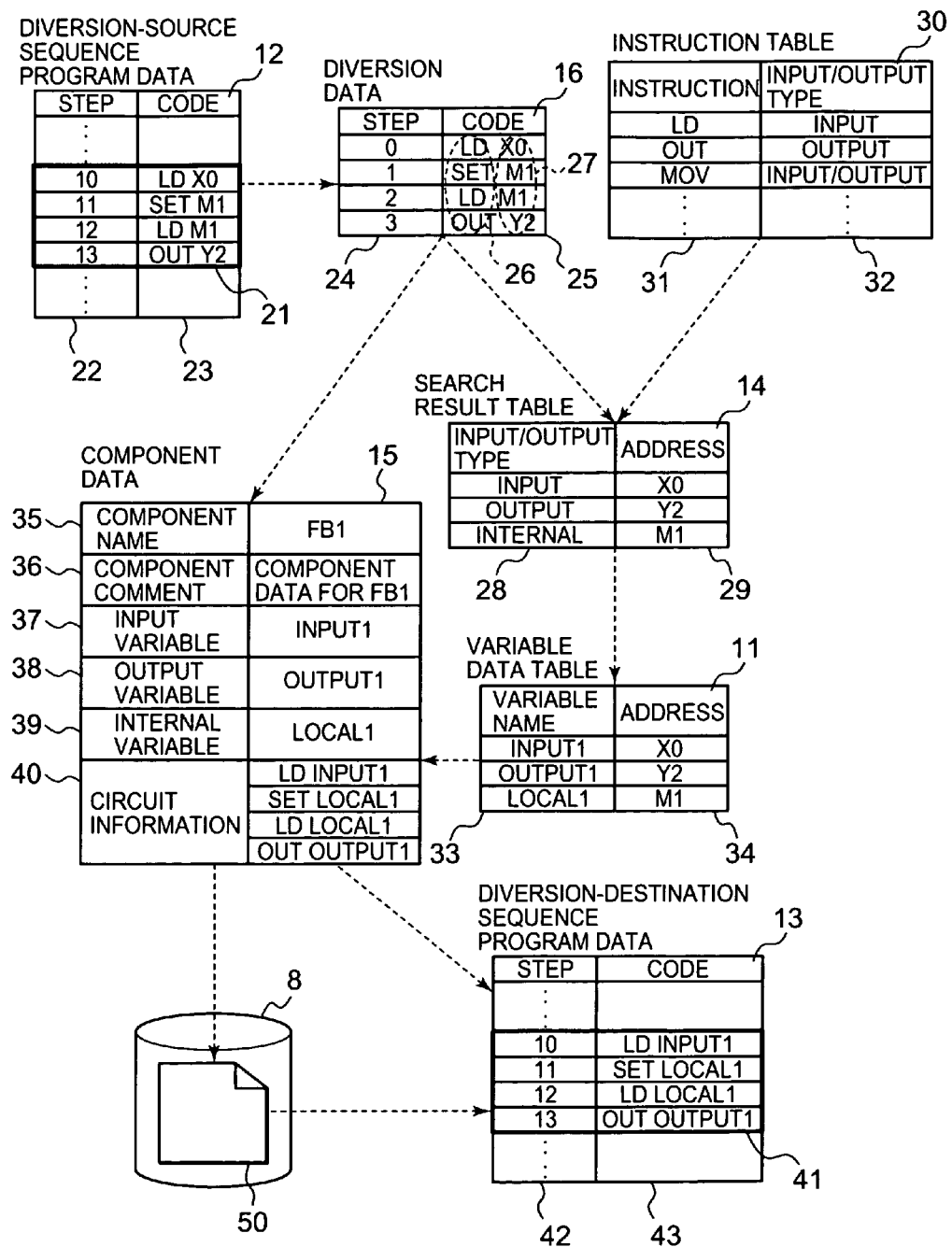
FIG. 4 is an operational diagram for the peripheral device for a PLC according to the present invention.

FIG. 4 is an operational diagram for the peripheral device for a PLC in the present invention. In FIG. 4, numeral 12 denotes diversion-source sequence program data. Numeral 21 denotes a sequence program portion that the operator has selected using the input device 2 from the diversion-source sequence program data 12. Numeral 23 denotes codes in the diversion-source sequence program data 12. Numeral 22 denotes step numbers corresponding to the codes 23 in the diversion-source sequence program data 12. Numeral 25 denotes codes in the diversion data 16. Numeral 24 denotes step numbers corresponding to the codes 25 in the diversion data 16. The codes 25 are composed of sets of instruction parts 26 and address parts 27. Numeral 28 denotes the input/output types of the addresses 29 retrieved from the diversion data 16. Numeral 30 denotes an instruction table in which instructions 31 written in the sequence program and the input/output types 32 of the parameters corresponding to the instructions are listed. The instruction table 30 is included in the system program 1 in FIG. 1. Numeral 34 denotes what are copied into the variable data table 11 from the addresses 29 in the search result table 14 in order to add variable names 33. The variable names 33 are alias names that are generalized addresses, corresponding to the addresses 34. Numeral 35 denotes the name of a component to be stored in the component storage 50, and numeral 36 denotes a component comment to be added to the component. Numeral 37 denotes an input variable created from a variable name 33 in the variable data table 11; numeral 38 denotes an output variable; and numeral 39 denotes an internal variable. Numeral 40 denotes circuit information created from the diversion data 16 and the variable data table 11. Numeral 41 denotes a sequence program component inserted in the diversion-destination sequence program data 13, and numeral 42 denotes step numbers of codes 43 in the diversion-destination sequence program data 13.

Figure 5:
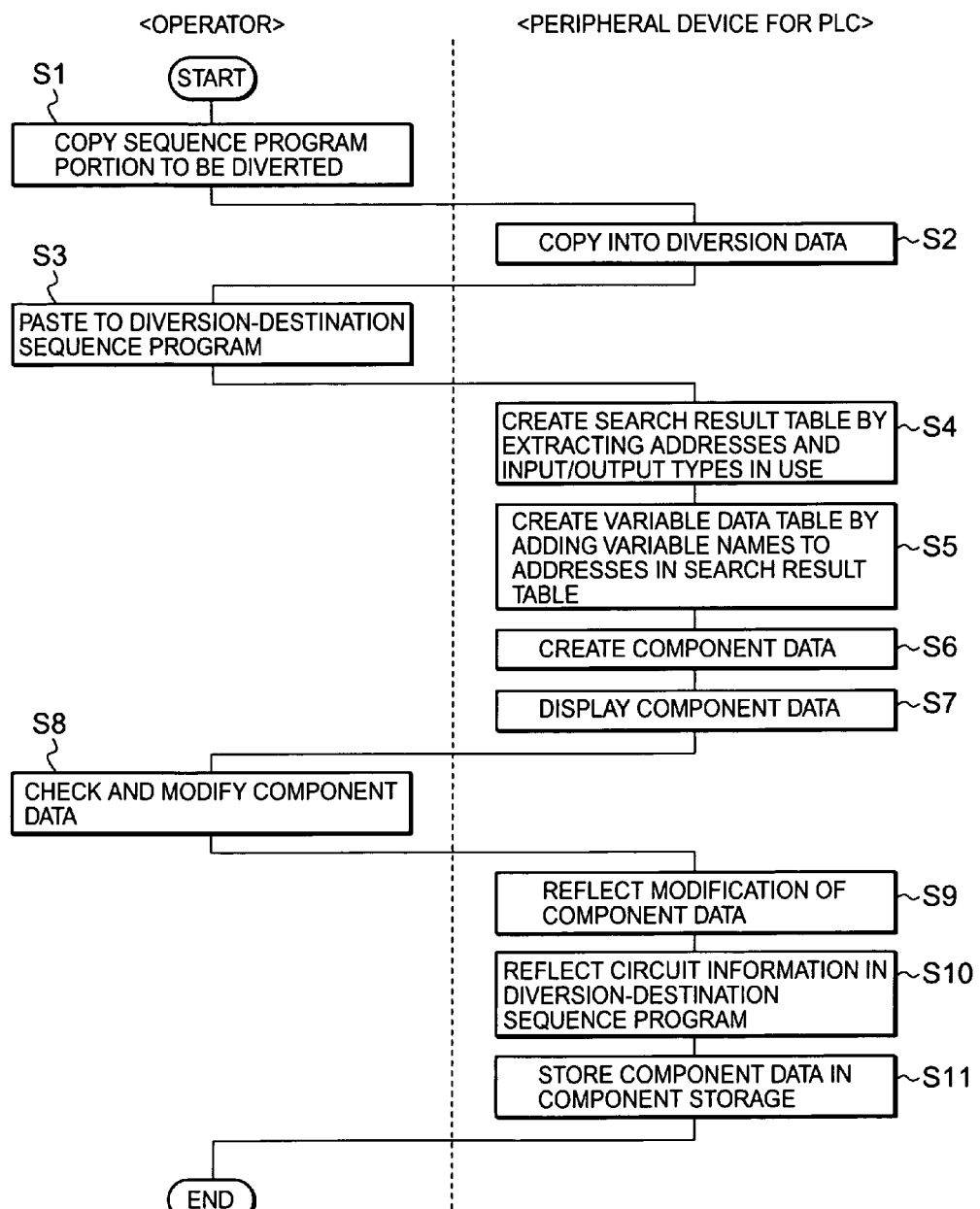
FIG. 5 is an operational flowchart for the peripheral device for a PLC according to the present invention.

FIG. 5 is a flowchart for the operation when, in the peripheral device for a PLC in the present invention, a portion of a sequence program created in the past is diverted into a new sequence program.

Figure 6:
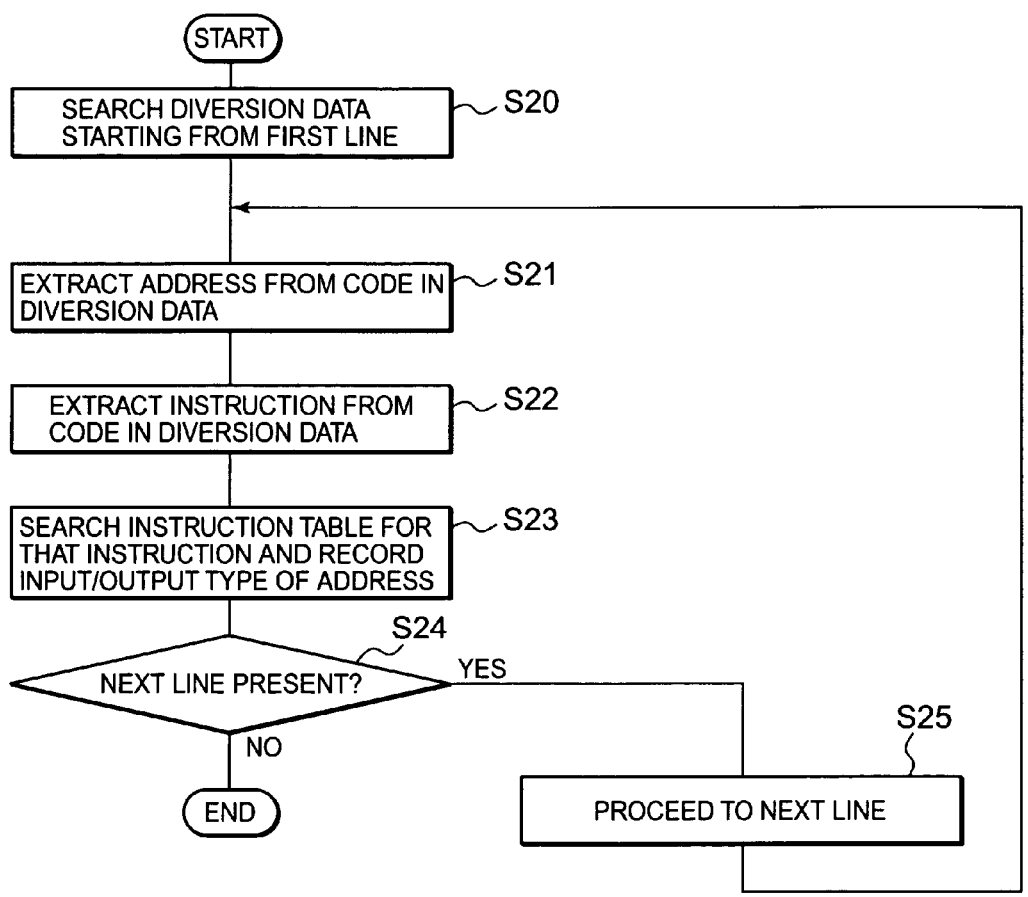
FIG. 6 is another operational flowchart for the peripheral device for a PLC according to the present invention.

FIG. 6 is a detailed operational flow for processing in which, in processing step S4 in the operational flow in FIG. 5, the peripheral device for a PLC in the invention extracts from the diversion data 16 addresses and input/output types that are in use, to get the search result table 14.

Figure 7:
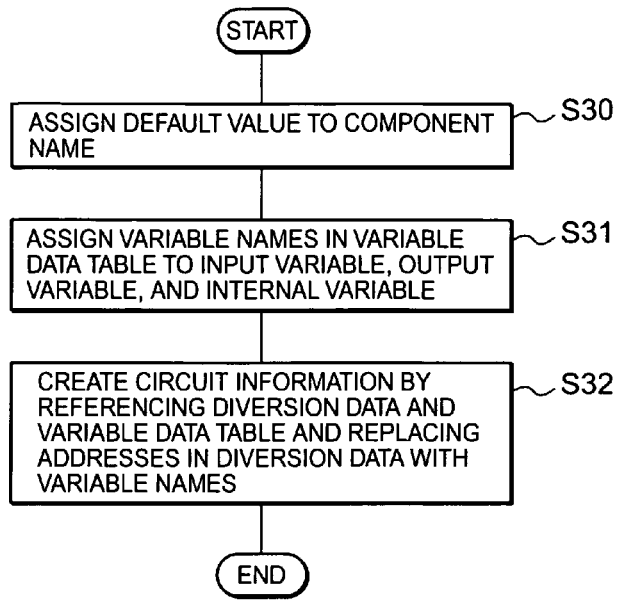
FIG. 7 is another operational flowchart for the peripheral device for a PLC according to the present invention.

FIG. 7 is a detailed operational flow for processing in which, in processing step S6 in the operational flow in FIG. 5 the peripheral device for a PLC in the present invention creates the component data 15.

Figure 8:
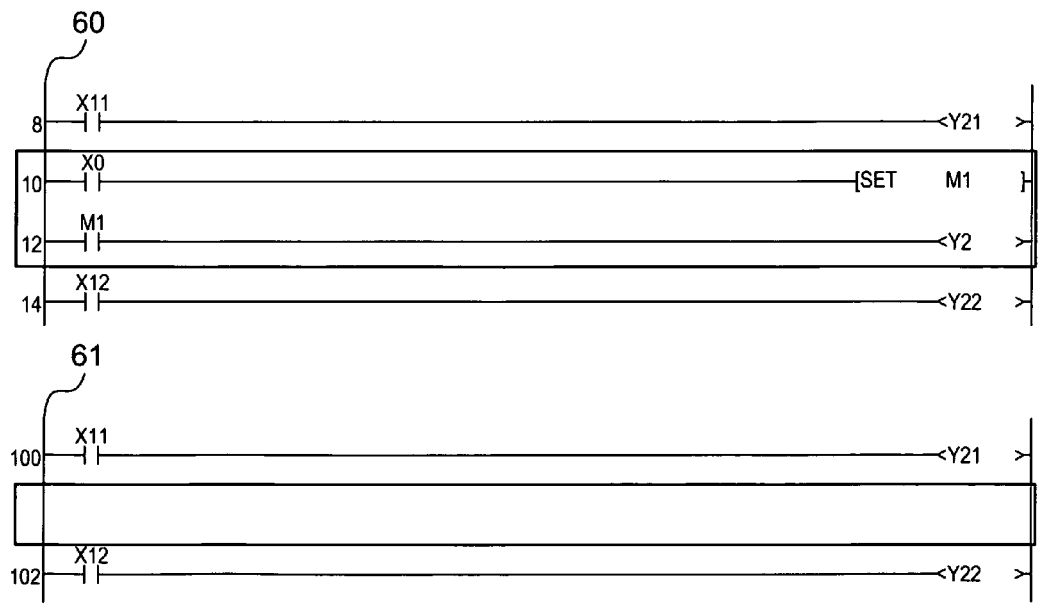
FIG. 8 is a screen display example displaying a diversion-source sequence program and a diversion-destination sequence program before the sequence program is diverted.

FIG. 8 is an example of a circuit display before the diversion of the sequence program is performed in the peripheral device for a PLC in the present invention.

Figures 9, 10:
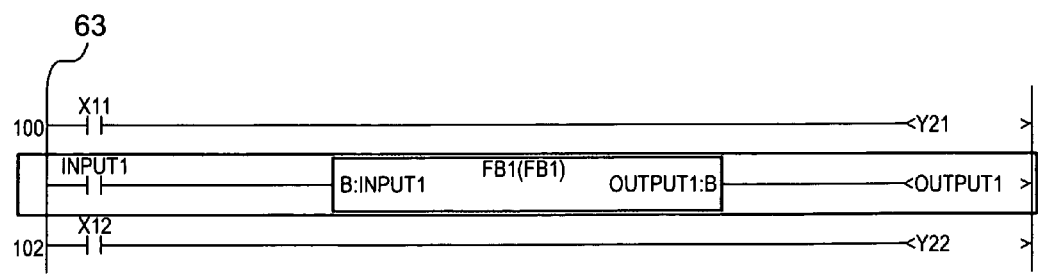
FIG. 9 is a screen display example of a component data confirmation screen according to the present invention.
FIG. 10 is a screen display example displaying the diversion-destination sequence program after the sequence program is diverted according to the present invention.

FIG. 9 is a display example of a component data confirmation screen in the peripheral device for a PLC in the present invention.

FIG. 10 is an example of the circuit display after the diversion of the sequence program is performed in the peripheral device for a PLC in the present invention.

Figure 11:
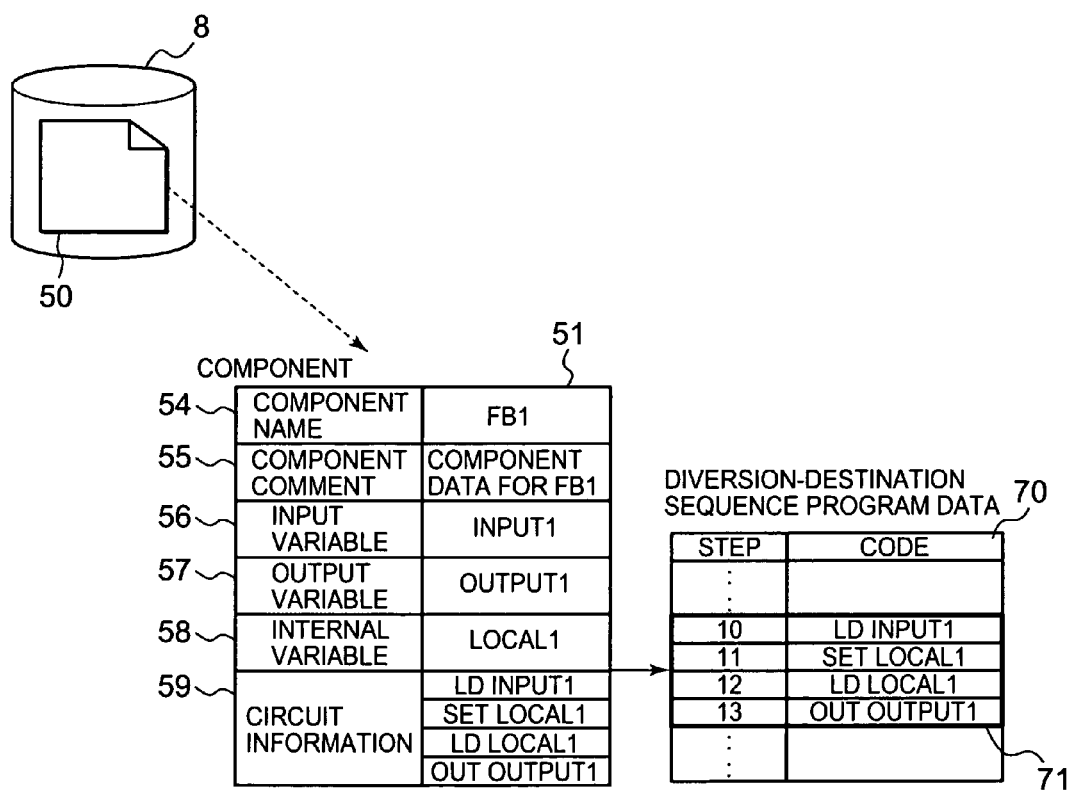
FIG. 11 is an operational diagram for the peripheral device for a PLC according to the present invention.

FIG. 11 is an operational diagram when, in the peripheral device for a PLC in the present invention, the sequence program component that has been stored in the component storage 50 is diverted into a new sequence program. In FIG. 11, numeral 51 denotes a sequence program component stored in the component storage 50 that is present in the external storage device 8. Numeral 54 denotes a component name of the sequence program component 51; numeral 55 denotes a component comment added to the sequence program component 51; numeral 56 denotes an input variable for the sequence program component 51; numeral 57 denotes an output variable for the sequence program component 51; numeral 58 denotes an internal variable for the sequence program component 51; and numeral 59 denotes circuit information. Numeral 71 denotes the sequence program component inserted into the diversion-destination sequence program data 70.

Figure 12:
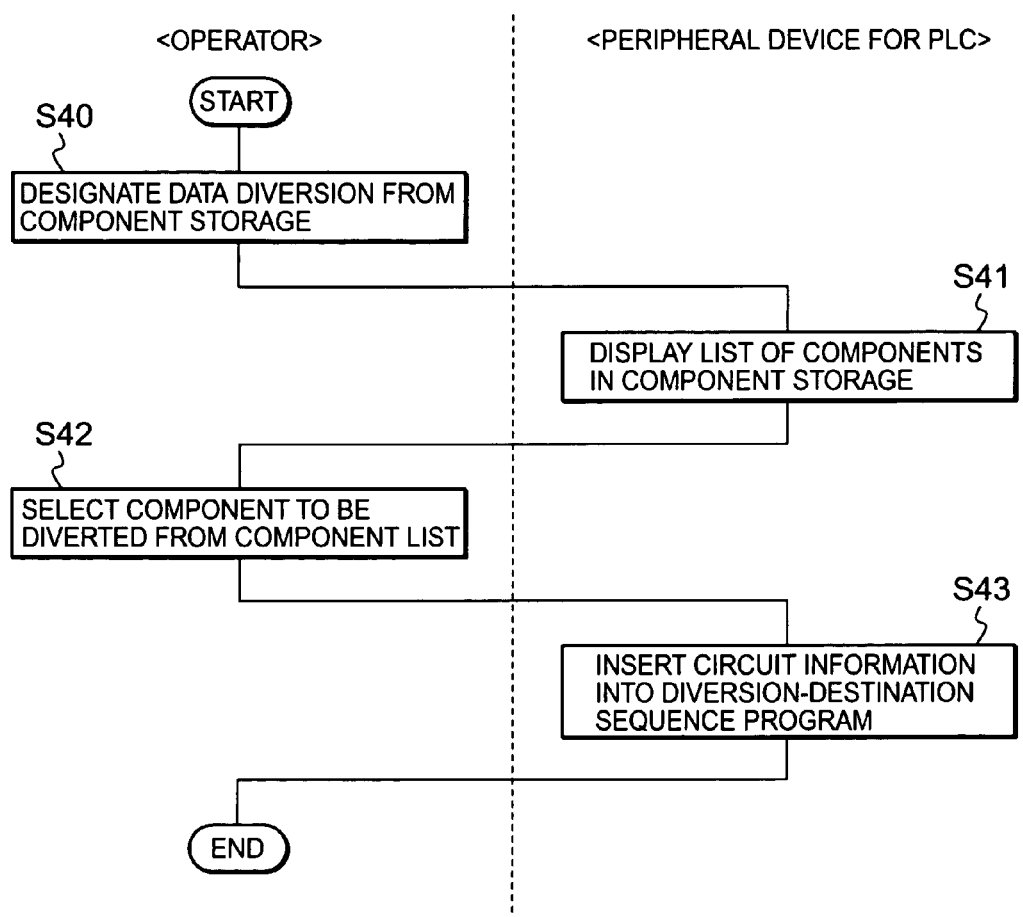
FIG. 12 is another operational flowchart for the peripheral device for a PLC according to the present invention.

FIG. 12 is an operational flowchart when, in the peripheral device for a PLC in the present invention, the sequence program component that has been stored in the component storage 50 is diverted into a new sequence program.

Next, the operation of the system in the present embodiment will be described using an example in which the sequence program portion 21 designated by the operator is diverted from the diversion-source sequence program data 12 created in the past into the diversion-destination sequence program data 13.

Screen images of the peripheral device for a PLC, displaying the diversion-source sequence program and the diversion-destination sequence program before the processing in the present invention, are indicated by numerals 60 and 61 in FIG. 8, respectively. The portion enclosed by a thick frame in numeral 60 is the sequence program portion that is desired to be diverted, and the portion enclosed by a thick frame in numeral 61 is the position that the operator selects as a destination of diversion.

In FIG. 5, firstly in the diversion-source sequence program, the operator selects the sequence program portion 21 to be diverted using the input device 2 (step S1) and performs copying.

Next, the peripheral device for a PLC copies into the diversion data 16 the selected sequence program portion 21 to be diverted.

Next, the operator performs an operation for pasting the selected sequence program portion 21 to be diverted to a position into which the operator desires to insert in the diversion-destination sequence program 13 (step S3).

Next, the peripheral device for a PLC creates the search result table 14 from the diversion data 16 (step S4). The details of the processing step S4 are illustrated in the flowchart in FIG. 6. In search processing in the processing step S4, firstly, the diversion data 16 is searched starting from the first line (step S20). An address 27 ("X0" in this case) is extracted from the code 25 ("LD X0" in this case) in the diversion data 16, and is recorded as the address 29 in the search result table 14 (step S21).

Next, an instruction 26 ("LD" in this case) is extracted from the code 25 ("LD X0" in this case) in the diversion data 16 (step S22), and the instructions 31 in the instruction table 30 prepared in the system program 1 in FIG. 1 is searched for the extracted instruction; whereby the input/output type 32 ("input" in this case) of the address 27 ("X0" in this case) used in the code 25 ("LD X0" in this case) in the first line in the diversion data 16 is determined, and recorded in the input/output type 28 in the search result table 14 (step S23).

Next, whether a next line is present in the diversion data 16 is determined (step S24). If a next line is present, then the processing proceeds to the next line (step S25). Thus, all the addresses used in the diversion data 16 and the corresponding input/output types are determined, to complete the search result table 14.

After the processing for creating the search result table 14 from the diversion data 16 (step S4 in FIG. 5) is completed, the peripheral device for a PLC adds, according to the input/output types 28 of the addresses 29 listed in the search result table 14, to the addresses corresponding variable names 33. More specifically, a variable name "INPUT+number" is added to the address whose input/output type is "input"; "OUTPUT+number" is added to the address whose input/output type is "output"; and "LOCAL+number" is added to the address whose input/output type is "internal". Thus the variable data table 11 is created (step S5).

Next, the component data 15 is created (step S6). The details of the processing step S6 are illustrated in the flowchart in FIG. 7. In the processing step S6 for creating the component data, firstly, a default component name ("FB1" in this case) is assigned (step S30) to the component name 35. Next, the variable name "INPUT+number" in the column of the variable names 33 in the variable data table 11 is assigned to the input variable 37; the variable name "OUTPUT+number" in the column of the variable names 33 in the variable data table 11 is assigned to the output variable 38; and the variable name "LOCAL+number" in the column of the variable names 33 in the variable data table 11 is assigned to the internal variable 39 (step S31).

Next, while the diversion data 16 and the variable data table 11 are referenced, the addresses 27 in the codes 25 in the diversion data 16 are replaced with the variable names 33 (for example, the address 27 "X0" in the code 25 "LD X0" in the first line in the diversion data 16 is replaced with the variable name 33 "INPUT1" corresponding to "X0" in the variable data table 11, to get "LD INPUT1"), whereby the circuit information 40 is created (step S32). The processing steps S30 through S32 are executed to create the component data 15.

Next, the peripheral device for a PLC displays via the display device 3 the created component data 15 to the operator (step S7).

The operator uses the input device 2 to check the component data 15, and to edit the component name 35, the component comment 36, the input variable 37, the output variable 38, or the internal variable 39, if necessary (step S8). The screen image therefor is indicated by numeral 62 in FIG. 9.

Next, the peripheral device for a PLC carries out processing for reflecting the modification of the component data 15, made by the operator (step S9). For example, when the component name in the screen display example 62 in FIG. 9 is modified from "FB1" to "BUHIN" in the processing step S8 by the operator, the peripheral device for a PLC modifies the component name 35 of the component data 15 from "FB1" to "BUHIN" in step S9.

Next, the circuit information 40 in the component data 15 is inserted into the position 37 designated by the operator in the new sequence program data 13 that is a diversion destination, to be developed in the form of an FB (function block (see JIS 350B)) (step S10). The screen image at this time is indicated by numeral 63 in FIG. 10.

After the component diversion processing in step S10 is performed, the peripheral device for a PLC stores the created component data 15 as a sequence program component 51 in the component storage 50 provided in the external storage device 8 (step S11).

In the above-described example, the processing steps for componentizing a portion of a sequence program created in the past and for diverting the portion from the sequence program into a new sequence program have been described. In the present invention, when a sequence program is diverted as in the above-described example, the processing steps for componentizing the diverted sequence program and for storing the program component into the component storage 50 in the external storage device 8 are provided, so that the program component can be diverted from the component storage 50 into a new sequence program.

Here, an example in which a sequence program component that has been stored in the component storage 50 is diverted into a new sequence program will be described.

It is assumed that, other than the sequence program component 51 registered in the above-described example, sequence program components such as a sequence program component 52 and a sequence program component 53, which have already been componentized according to the same processing steps, are present in the component storage 50. In the present example, the sequence program component 51 will be diverted into the new sequence program. The format of each component is the same as the component data 15.

In FIG. 12, when the operator firstly designates data diversion from the component storage into the new sequence program that is a diversion destination (step S40), the peripheral device for a PLC displays via the display unit 3 a list of the components stored in the component storage 50 (step S41).

Next, the operator selects from the displayed component list a component to be diverted (step S42). Here, it is assumed that the sequence program component 51 has been selected. For the selection, the component name 54, the component comment 55, the input variable 56, the output variable 57, the internal variable 58, and the circuit information 59 in the component data can be searched for a keyword.

Next, the peripheral device for a PLC inserts the circuit information 59 in the selected sequence program component 51 into the position 71 designated by the operator in the diversion-destination sequence program data 70, to develop the information in the form of an FB (step S43).

As described above, according to the present invention, when an operation is performed in which a portion of an existing sequence program created in the past is copied and pasted into a new sequence program, input/output addresses and internal addresses that require replacement are automatically replaced; whereby an operator does not have to manually replace the input/output addresses and the internal addresses, so that the existing sequence program can be diverted and reused to efficiently create a new sequence program.

INDUSTRIAL APPLICABILITY

As described above, a peripheral device for a PLC and a program creating method therefor relevant to the present invention are suitable to be used for creating and editing sequence programs.

What is claimed is:

1. A peripheral device for a programmable logic controller, comprising:
   a processor; and
   a memory storing software modules, the software modules comprising:
   an instruction table for storing instructions and storing corresponding input/output types of parameters for the instructions, wherein the input/output types of the parameters for the instructions comprise an input type, an output type, and an internal type;
   a search and determination means for searching the instruction table for an instruction in a code in a portion of a sequence program selected as diversion data from an existing diversion-source sequence program, to determine a corresponding input/output type of a parameter for the instruction;
   a search result creating and storing means for creating and storing a search result table by combining at least one of input/output address and internal address in the code in the selected portion of the sequence program, with the determined corresponding input/output type;
   a component data creating means for creating a variable data table by automatically replacing the determined corresponding input/output types stored in the search result table with variable names, and for creating component data by adding the corresponding variable names to variables and to circuit information;
   a component data diversion means for diverting the component data into an arbitrary position in a designated sequence program;
   a sequence-program-component storing means for storing into a component storage the created component data as a sequence program component;
   a sequence-program-component displaying device for displaying the sequence program components stored in the component storage;
   a sequence-program-component selecting means for selecting a desired sequence program component from the sequence program components displayed by the sequence-program-component displaying device; and a sequence-program-component diversion means for diverting the selected sequence program component into a new sequence program.

2. A program creating method of copying a portion of an existing sequence program and pasting the portion into a new sequence program, for a peripheral device for a programmable logic controller, the method comprising:

a search and determination step of searching an instruction table for storing instructions and storing corresponding input/output types of parameters for the instructions, for an instruction in a code in a portion of the sequence program selected as diversion data from an existing diversion-source sequence program, to determine a corresponding input/output type of a parameter for the instruction in the code, wherein the input/output types of the parameters for the instructions comprise an input type, an output type, and an internal type;

a search result creating and storing step of creating and storing into a memory a search result table by combining the determined corresponding input/output type, with at least one of input/output address and internal address in the code in the selected portion of the sequence program;

a component data creating step of creating a variable data table by automatically replacing the determined corresponding input/output types stored in the search result table with variable names, and of creating component data by adding the corresponding variable names to variables and to circuit information;

a component data diversion step of diverting the component data into an arbitrary position in a new sequence program as a diversion destination;

a sequence-program-component storing step of storing into a component storage the created component data as a sequence program component;

a sequence-program-component displaying step of displaying the sequence program components stored in the component storage;

a sequence-program-component selecting step of selecting a desired sequence program component from the sequence program components displayed in the sequence-program-component displaying step; and a sequence-program-component diversion step of diverting into a new sequence program the desired sequence program component that has been selected.

3. A peripheral device for a programmable logic controller, comprising:

a processor; and a memory storing software modules, the software modules comprising:

an instruction table that stores instructions and stores corresponding input/output types of parameters for the instructions, wherein the input/output types stored in the instruction table comprise at least one of an input type, an output type, or an internal type;

a search and determination module that searches the instruction table for an instruction in a code in a portion of a sequence program selected as diversion data from an existing diversion-source program, to determine a corresponding input/output type of a parameter for the instruction;

a search result creating and storing module that creates and stores a search result table by combining at least one of input/output address and internal address in the code in the selected portion of the sequence program, with the determined corresponding input/output type;

a component data creating module that creates a variable data table by automatically replacing the determined corresponding input/output types stored in the search result table with variable names, and creates component data by adding the corresponding variable names to variables and to circuit information;

a component data diversion module that diverts the component data into an arbitrary position in a designated sequence program;

a sequence-program-component storing module for storing into a component storage the created component data as a sequence program component;

a sequence-program-component displaying device for displaying the sequence program components stored in the component storage;

a sequence-program-component selecting module for selecting a desired sequence program component from the sequence program components displayed by the sequence-program-component displaying device; and a sequence-program-component diversion module for diverting the selected sequence program component into a new sequence program.

4. The peripheral device for the programmable logic controller according to claim 1, wherein a user selects the portion of the sequence program from the existing diversion-source sequence program being displayed.

5. The program creating method according to claim 2, for the peripheral device for the programmable logic controller, the method further comprising a user selecting the portion of the sequence program from the existing diversion-source sequence program being displayed.

* * * * *